3,647,790
QUINOXALINYL-OXAZOLIDINES AND
-OXAZINES
John R. Potoski, Rosemont, and Meier E. Freed, Philadelphia, Pa., assignors to American Home Products Corporation, New York, N.Y.
No Drawing. Filed Apr. 8, 1969, Ser. No. 814,442
Int. Cl. C07d 87/06
U.S. Cl. 260—244 R          11 Claims

ABSTRACT OF THE DISCLOSURE

Novel 2-quinoxalinyl-oxazolidine-3-amides and -sulfonamides and 2-quinoxalinyl-oxazine-3-amides and -sulfonamides (I) are provided, with pharmacological activity as nervous system depressants and utility to induce calming. Compounds (I) are prepared by condensing a [(2-quinoxalinylmethylene)amine]alkanol (II) with a benzoyl- or phenylsulfonyl-chloride (III).

This invention relates to quinoxalinyl-oxazolidines and -oxazines, and more particularly to 2-quinoxalinyl-oxazolidine-3-amides and -sulfonamides and to 2-quinoxalinyl-oxazine-3-amides and -sulfonamides having pharmacological activity.

DESCRIPTION OF THE INVENTION

The compounds contemplated by this invention are those of Formula I:

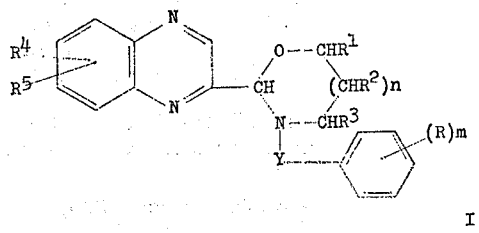

I wherein
Y is CO or $SO_2$;
$n$ is 0 or 1, $m$ is 1, 2 or 3;
R is (lower)alkyl, (lower)alkoxy, halo, nitro or trifluoromethyl;
$R^1$, $R^2$ and $R^3$ are hydrogen, (lower)alkyl, hydroxy (lower)alkyl, (lower)alkoxy(lower)alkyl, phenyl or phenyl-substituted with from 1 to 3 substituents selected from (lower)alkyl, (lower)alkoxy, phenoxy(lower)alkyl, trifluoromethyl, nitro or halo; and
$R^4$ and $R^5$ are hydrogen, (lower)alkyl, nitro, chloro, (lower)alkoxy, amino or (lower)alkanoylamino.

As specific embodiments of this invention there are contemplated a preferred family of Formula I compounds wherein Y is CO or $SO_2$, R is 4'-methyl or 4'-fluoro when $m$ is 1 or 3', 4', 5'-trimethoxy when $m$ is 3, $R^1$ is hydrogen or phenyl, $R^2$ is hydrogen when $n$ is 1, $R^3$ is hydrogen or methyl and $R^4$ and $R^5$ are hydrogen.

Especially preferred embodiments are the compounds of Formula I which are:
2-(2-quinoxalinyl)-3-(p-tolylsulfonyl)oxazolidine;
3-(p-fluorophenylsulfonyl)-2-(2-quinoxalinyl)oxazolidine;
2-(2-quinoxalinyl)-3-(3,4,5-trimethoxybenzoyl)oxazolidine;
tetrahydro-2-(2-quinoxalinyl)-3-(p-tolylsulfonyl)-2H-1,3-oxazine;
5-phenyl-2-(2-quinoxalinyl)-3-(p-tolylsulfonyl)oxazolidine;
4-methtyl-5-phenyl-2-(2-quinoxalinyl)-3-(p-tolylsulfonyl)oxazolidine;
3-(p-fluorophenylsulfonyl)-2-(2-quinoxalinyl)oxazolidine;
2-(2-quinoxalinyl)-3-(3,4,5-trimethoxybenzoyl)oxazolidine;
tetrahydro-2-(2-quinoxalinyl)-3-(p-tolylsulfonyl)-2H-1,3-oxazine;
5-phenyl-2-(2-quinoxalinyl)-3-(p-tolylsulfonyl)oxazolidine;
4-methyl-5-phenyl-2-(2-quinoxalinyl)-3-(p-tolylsulfonyl)oxazolidine;
2-(6-nitro-2-quinoxalinyl)-3-(p-tolylsulfonyl)oxazolidine;
3-(2,5-dichlorophenylsulfonyl)-2-(2-quinoxalinyl)oxazolidine;
3-(p-chlorophenylsulfonyl)-tetrahydro-2-(quinoxalinyl)-2H-1,3-oxazine;
3-(p-fluorophenylsulfonyl)-tetrahydro-2-(2-quinoxalinyl)-2H-1,3-oxazine;
2-(6,7-dichloro-2-quinoxalinyl)-3-(p-tolylsulfonyl)oxazolidine;
3-(p-fluorophenylsulfonyl)-tetrahydro-2-(6,7-dichloro-2-quinoxalinyl)-2H-1,3-oxazine; and
3-(p-fluorophenylsulfonyl)-tetrahydro-2-(6,7-dimethoxy-2-quinoxalinyl)-2H-1,3-oxazine.

Compounds of Formula I are pharmacologically active as central nervous system depressants and are of value to induce calming.

When used herein and in the appended claims, the term "(lower)alkyl" contemplates hydrocarbon groups, straight chain and branched, of from about 1 to about 6 carbon atoms, illustrative members of which are methyl, ethyl, n-propyl, i-propyl, n-butyl, t-buyl, n-pentyl, n-hexyl, 2-methylpentyl and the like. With respect to substituents $R^1$, $R^2$ and $R^3$, preferred (lower)alkyl groups have a maximum of about 3 carbon atoms. Also contemplated are analogs and derivatives of (lower)alkyl groups, such as "(lower)alkoxy" which are alkyl-O-groups wherein the alkyl group is as defined as hereinabove, illustrative members of which are methoxy, ethoxy, n-propoxy, i-propoxy, n-butoxy, t-butoxy, n-pentoxy, n-hexoxy, 2-methylpentoxy, and the like. "Hydroxy(lower)alkyl" contemplates (lower)alkyl groups, is as defined and illustrated above, monosubstituted with a hydroxyl group. "(Lower)alkoxy (lower)alkyl" contemplates (lower)alkyl groups, as defined and illustrated above, monosubstituted with (lower)alkoxy groups defined and illustrated above. "Phenoxy (lower)alkyl" contemplates (lower)alkyl groups, as defined and illustrated above, monosubstituted with a phenoxy group. "(Lower)alkanoylamino" contemplates alkyl- CONH- of from about two to about 6 carbon atoms, straight chain and branched, illustrative members of which are acetylamino, n-propionylamino, n-butanoylamino, n-pentanoylamino, hexanoylamino, 2-methylpentanoylamino and the like. The term "halo" contemplates fluoro, chloro, bromo and iodo.

The compounds of this invention can be prepared by a number of methods, but a convenient procedure is outlined as follows:

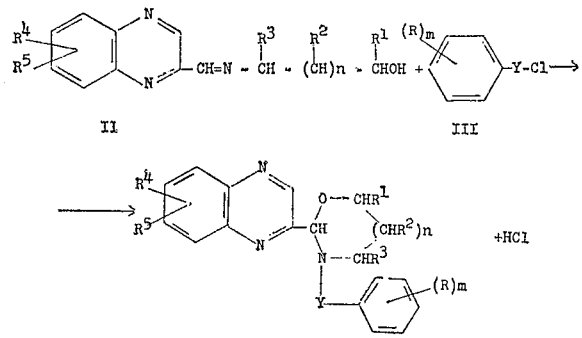

wherein Y, n, m, R, $R^1$, $R^2$, $R^3$, $R^4$ and $R^5$ are as hereinabove defined. The pathway comprises condensing an appropriately substituted [(2-quinoxalinylmethylene)amino] alkanol (II) with an appropriately substituted benzoyl chloride or phenylsulfonyl chloride (III). Generally, a mixture of II which a stoichiometrical amount or slight excess, e.g., about a 10% excess, of III in about 10 to about 30 parts by volume of pyridine can be allowed to stand at temperatures of from about 0° C. to about 30° C., but preferably at about 10° C., for from about 1 hour to about 16 hours, during which time condensation is substantially completed. The product can be recovered in any usual way, but one convenient means comprises pouring the mixture into several volumes, e.g., 2–10 volumes, of ice water. This causes product I to precipitate and it can be recovered by filtration. If desired, product I can be purified by recrystallization, e.g., from chloroform-hexane, benzene,-hexane, cyclohexane-benzene, and the like.

The starting materials of Formula III, the benzoyl chlorides or phenylsulfonyl chlorides are commercially available and can be easily prepared. Starting materials of Formula II, the [(2 - quinoxalinylmethylene)amino] alkanols, which those skilled in the art will recognize to be Schiff bases, can be prepared by condensing a quinoxaline-2-carboxaldehyde (IV) with an appropriate amine (V) in a reaction-inert organic solvent for a period of from about one to about three hours at a temperature range of from about 25° C. to about the reflux temperature of the reaction mixture, according to the following pathway:

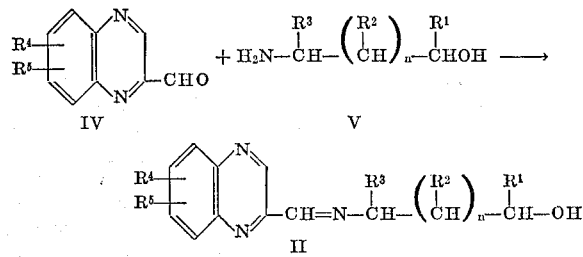

wherein n, $R^1$, $R^2$, $R^3$, $R^4$ and $R^5$ are as hereinabove defined. Preferably the reaction is conducted in benzene at reflux temperatures for a period of about 1.5 hours with removal of water by azeotropic distillation. When the reaction is complete the resulting quinoxaline-2-carboxaldehyde Schiff base (II) is separated by conventional recovery procedures, e.g., the solvent is evaporated and the residue recrystallized from a suitable solvent, e.g., hexane, tetrahydrofuran, cyclohexane, an ethyl acetate-cyclohexane mixture and the like. These procedures are exemplified in detail in copending United States patent application Ser. No. 765,975, John R. Potoski and Meier E. Freed, filed Oct. 8, 1968, entitled "Schiff Bases of Quinoxaline-2-Carboxaldehydes and Their Reduction Products."

The compounds of Formula I of this invention have demonstrated pharmacological activity. In particular they have been found to exert a depressant action on the central nervous system when tested under standard and accepted pharmacological procedures in laboratory animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formula I of this invention may be administered alone or in combination with other pharmacologically-active ingredients. Whether singly or in combination, they may be used in the form of solid compositions for oral administration combined, if desired, with extenders or carriers which are relatively non-toxic or inert. They may be put into tablet, capsule or powder form. On the other hand, they may be administered in liquid form as a suspension or solution in a suitable vehicle for parenteral use. By way of illustration pharmacological action as central nervous system depressant agents in mice have been demonstrated when the compound is administered at dosages of 12.7, 40, 127 and 400 mg./kg.

DESCRIPTION OF THE PREFERRED EMBODIMENTS

The following examples are given by way of illustration and are not to be construed as limitations of the invention, many variations of which are possible without departing from the spirit or scope thereof.

Example 1.—2-(2-quinoxalinyl)-3-(p-tolylsulfonyl) oxazolidine

A solution of 2.0 g. (0.010 mole) of 2-[(2-quinoxalinylmethylene)amino]ethanol and 2.2 g. (0.011 mole) of p-toluenesulfonyl chloride in 40 ml. of pyridine is allowed to stand at 10° C. overnight and then is poured into 150 g. of ice water. The white solid which precipitates is filtered and dried in vacuo to yield 3.2 g. (90% yield) of product with M.P. 153–156° C. Recrystallization from chloroformhexane gives 3.0 g. of pure product with M.P. 155–156° C.

Analysis.—Calcd. for $C_{18}H_{17}N_3O_3S$ (percent): C, 60.82; H, 4.82; N, 11.82. Found (percent): C, 61.05; H, 4.72; N, 11.52.

Example 2.—3-(p-fluorophenylsulfonyl)-2-(2-quinoxalinyl)oxazolidine

A solution of 2-[(2-quinoxalinylmethylene)amino] ethanol (1.5 g.) and 1.5 g. (0.075 mole) of p-fluorobenzenesulfonyl chloride in 25 ml. of pyridine is allowed to stand at 10° C. overnight then is poured into 150 g. of ice water and filtered to obtain 2.0 g. (74% yield) of product with M.P. 155–160° C. Recrystallization of the product twice from hexane-benzene affords 1.55 g. with M.P. 159–161° C.

Analysis.—Calcd. for $C_{17}H_{14}N_3O_3SF$ (percent): C, 56.81; H, 3.93; N, 11.69; S, 8.82. Found (percent): C, 57.02; H, 4.23; N, 11.62; S, 8.89.

Example 3.—2-(2-quinoxalinyl)-3-(3,4,5-trimethoxybenzoyl)oxazolidine

A solution of 1.0 g. (0.005 mole) of 2-[(2-quinoxalinylmethylene)amino]ethanol and 1.2 g. (0.005 mole) of 3,4,5-trimethoxybenzoyl chloride in 25 ml. of pyridine is allowed to stand at 10° C. overnight and is then poured into 100 g. of ice water. On standing a white solid precipitates which on filtration gives crude product with M.P.

138–140° C. Recrystallization of the crude product affords 0.85 g. (43% yeld) of a pure product with M.P. 140–142° C.

*Analysis.*—Calcd. for $C_{21}H_{21}N_3O_5$ (percent): C, 63.79; H, 5.35; N, 10.63. Found (percent): C, 63.87; H, 5.18; N, 10.64.

Example 4.—Tetrahydro-2-(2-quinoxalinyl)-
3-(p-tolylsulfonyl)-2H-1,3-oxazine

A solution of 2.7 g. (0.012 mole) of 3-[(2-quinoxalinylmethylene)amino]propanol and 2.6 g. (0.013 mole) of p-toluenesulfonyl chloride in 25 ml. of pyridine is allowed to stand at 10° C. for 5 hours and is then poured into 150 g. of ice water. Filtration gives 3.9 g. (88% yield) of product with M.P. 119°–121° C. Recrystallization of the product from cyclohexane-benzene affords 3.4 g. (74% yield) of pure product with M.P. 123–125° C.

*Analysis.*—Calcd. for $C_{19}H_{19}N_3O_3S$ (percent): C, 61.78; H, 5.19; N, 11.38; S, 8.68. Found (percent): C, 61.58; H, 4.94; N, 11.62; S, 8.73.

Example 5.—5-phenyl-2-(2-quinoxalinyl)-
3-(p-tolylsulfonyl)oxazolidine

A solution of 1.8 g. (0.0065 mole) of α([(2-quinoxalinylmethylene)amino]methyl)benzyl alcohol and 1.5 g. of p-toluenesulfonyl chloride in 20 ml. of pyridine is allowed to stand at 10° C. for 1 hour and is then poured into 100 g. of ice water. Filtration gives 2.7 g. (96% yield) of product with M.P. 133–140° C. Recrystallization of the product from cyclohexane-benzene gives 2.1 g. of pure product (75% yield) with M.P. 141–143° C.

*Analysis.*—Calcd. for $C_{24}H_{21}N_3O_3S$ (percent): C, 66.81; H, 4.91; N, 9.74; S, 7.43. Found (percent): C, 66.73; H, 4.98; N, 9.70; S, 7.44.

Example 6.—4-methyl-5-phenyl-2-(2-quinoxalinyl)-3-
(p-tolylsulfonyl)oxazolidine

A solution of 1.80 g. (0.0062 mole) of α-(1-[(2-quinoxalinylmethylene)amino]ethyl)benzyl alcohol and 1.4 g. of p-toluenesulfonyl chloride in 20 ml. of pyridine is allowed to stand at 10° C. for 1 hour and is then poured into 100 g. of ice water. Filtration gives 2.7 g. (98% yield) of product with M.P. 176–184° C. Recrystallization of the product from cyclohexane-benzene gives 1.7 g. (62% yield) of pure product with M.P. 186–188° C.

*Analysis.* — Calcd. for $C_{25}H_{23}N_3O_3S$ (percent): C, 67.40; H, 5.20; N, 9.43; S. 7.20. Found (percent): C, 67.73; H, 5.27; N, 9.72; S, 7.41.

Example 7

The procedure of Example 2 is repeated substituting appropriate Schiff bases from copending application Ser. No. 765,975, filed Oct. 8, 1968, and those prepared by procedures disclosed therein, and the following compounds of Formula I of this invention are obtained:

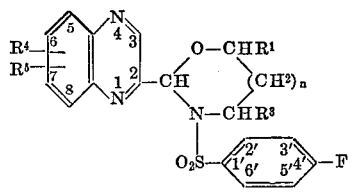

Example 8

The procedure of Example 2 is repeated, substituting corresponding benzoylchlorides and phenylsulfonyl chlorides for benzene-sulfonyl chloride and the following compounds of Formula I of this invention are obtained:

| n | R¹ | R² | R³ | R⁴ | R⁵ |
|---|---|---|---|---|---|
| 0 | H | | H | H | 5-OH |
| 0 | H | | –⟨phenyl⟩ | 6-Cl | 7-Cl |
| 0 | H | | H | 6-CH₃ | 7-CH₃ |
| 0 | H | | H | 7-CH₃(CH₂)₂CH₂ | H |
| 0 | H | | H | 6-CH₃O | 7-CH₃O |
| 0 | H | | H | 7-CH₃CONH | H |
| 0 | H | | H | H | 7-CH₃CH₂O |
| 0 | H | | H | 6-CH₃O | 7-CH₃ |
| 0 | H | | H | 8-CH₃(CH₂)₂CH₂ | H |
| 0 | CH₃ | | H | H | H |
| 0 | CH₂OH | | H | H | H |
| 0 | CH₂OCH₃ | | H | H | H |
| 0 | –⟨phenyl⟩ | | H | H | H |
| 0 | H | | –⟨phenyl⟩–CH₃ | H | H |
| 0 | H | | –⟨phenyl⟩–OCH₃ | H | H |
| 0 | H | | –⟨phenyl⟩–CH₂O⟨phenyl⟩ | H | H |
| 0 | H | | –⟨phenyl⟩–CF₃ | H | H |
| 0 | H | | –⟨phenyl⟩–NO₂ | H | H |
| 0 | H | | –⟨phenyl⟩–F | H | H |
| 0 | H | | –⟨phenyl⟩–Br | H | H |
| 0 | H | | –⟨phenyl⟩–Cl | H | H |
| 0 | H | | –⟨phenyl⟩–I | H | H |
| 0 | –⟨phenyl⟩ | | –⟨phenyl⟩ | H | H |

| n | R¹ | R² | R³ | R⁴ | R⁵ |
|---|----|----|----|----|----|
| 0 | H | ----- | H | 6-OH | 7-CH₃ |
| 0 | H | ----- | H | H | 7-CH₃CH₂CH₂O |
| 0 | H | ----- | H | 6-NH₂ | H |
| 0 | H | ----- | H | 6-NO₂ | H |
| 0 | H | ----- | 3,4,5-tri(OCH₃)phenyl | H | H |
| 1 | H | H | H | H | 5-OH |

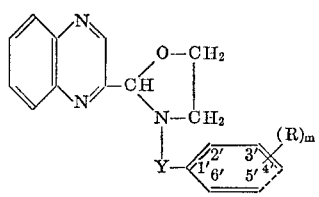

| m | R | Y |
|---|---|---|
| 1 | 4'-CH₃O | SO₂ |
| 1 | 4'-CH₃(CH₂)₄CH₂O | SO₂ |
| 3 | 3',4',5'-CH₃O | SO₂ |
| 1 | 4'-CH₃ | CO |
| 1 | 2'-F | SO₂ |
| 1 | 2'-F | CO |
| 1 | 4'-F | CO |
| 1 | 4'-Cl | SO₂ |
| 1 | 4'-I | SO₂ |
| 1 | 4'-Br | SO₂ |
| 1 | 4'-NO₂ | SO₂ |
| 1 | 4'-CF₃ | SO₂ |
| 1 | 4'-CH₃(CH₂)₄CH₂ | SO₂ |

Example 9

The procedure of Example 2 is repeated substituting appropriate starting materials and the following compounds of this invention are obtained:

3 - (p - fluorophenylsulfonyl) - 2 - (2 - quinoxalinyl)-oxazolidine, M.P. 159–161° C.;

2-(2-quinoxalinyl) - 3 - (3,4,5-trimethoxybenzoyl)oxazolidine, M.P., 140–142° C.;

Tetrahydro-2-(2-quinoxalinyl)-3 - (p-tolylsulfonyl)-2H-1,3-oxazine, M.P., 123–125° C.;

5-phenyl-2-(2-quinoxalinyl) - 3 - (p - tolylsulfonyl)oxazolidine, M.P., 141–143° C.;

4 - methyl - 5 - phenyl-2-(2-quinoxalinyl)-3-(p-tolylsulfonyl)oxazolidine, M.P., 186–188° C.;

2 - (6 - nitro-2-quinoxalinyl)-3-(p-tolylsulfonyl)oxazolidine, M.P., 147–149° C.;

3-(2,5-dichlorophenylsulfonyl) - 2 - (2-quinoxalinyl)oxazolidine, M.P., 110–112° C.;

3-(p-chlorophenylsulfonyl)-tetrahydro - 2 - (quinoxalinyl)-2H-1,3-oxazine, M.P., 143–145° C.;

3-(p-fluorophenylsulfonyl)-tetrahydro - 2 - (2-quinoxalinyl)-2H-1,3-oxazine, M.P., 91–93° C.;

2 - (6,7 - dichloro - 2 - quinoxalinyl)-3-(p-tolylsulfonyl)oxazolidine;

3-(p-fluorophenylsulfonyl)-tetrahydro - 2 - (6,7-dichloro-2-quinoxalinyl)-2H-1,3-oxazine; and 3-(p-fluorophenylsulfonyl) - tetrahydro - 2 - (6,7 - dimethoxy-2-quinoxalinyl)-2H-1,3-oxazine.

In evaluating the instant compounds for pharmacological activity, they are tested in vivo by standard methods with the following results:

The compound is administered to three mice (CF–1 14 to 24 grams) as a 1% suspension in water to which has been added polyoxyethylene sorbitan monooleate (emulsifier) at each of the following doses: 400, 127, 40 and 12.7 mg./kg.

The animals are watched for signs of general stimulation, general depression and autonomic activity and the observations are evaluated by methods described in detail in Turner, Screening Methods in Pharmacology, Academic Press, New York, p. 80 (1965), in the section entitled "A Test Group for Central Depressants."

2-(2-quinoxalinyl) - 3 - (p - tolylsulfonyl) - oxazolidine, administered intraperitoneally (i.p.), caused decreased motor activity and decreased respiration at 12.7 mg./kg.;

3-(p-fluorophenylsulfonyl) - 2 - (2 - quinoxalinyl)oxazolidine, administered perorally (p.o.), caused decreased motor activity at 127 mg./kg.; and, administered i.p., caused decreased motor activity and decreased respiration at 40 mg./kg.;

2-(2-quinoxalinyl) - 3 - (3,4,5 - trimethoxybenzoyl)oxazolidine, administered p.o., caused decreased motor activity and decreased respiration at 400 mg./kg.; and Tetrahydro-2-(2 - quinoxalinyl) - 3 - (p - tolylsulfonyl)-2H-1,3-oxazine, administered p.o., caused decreased motor activity and decreased respiration at 40 mg./kg. There were no deaths following administration of these compounds at the highest dose used, 400 mg./kg.

We claim:

1. A compound of the formula:

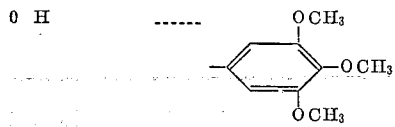

wherein Y is CO or SO₂; $n$ is 0 or 1, $m$ is 1, 2, or 3; R is (lower) alkyl, (lower) alkoxy, or halo; R¹, R², and R³ are hydrogen, (lower) alkyl, or phenyl; and R⁴ and R⁵ are hydrogen or nitro.

2. A compound as defined in claim 1 which is 2-(2-quinoxalinyl)-3-(p-tolylsulfonyl)oxazolidine.

3. A compound as defined in claim 1 which is 3-(p-fluorophenylsulfonyl)-2-(2-quinoxalinyl)-oxazolidine.

4. A compound as defined in claim 1 which is 2-(2-quinoxalinyl)-3-(3,4,5-trimethoxybenzoyl)oxazolidine.

5. A compound as defined in claim 1 which is tetrahydro-2-(2 - quinoxalinyl) - 3 - (p - tolylsulfonyl)-2H-1,3-oxazine.

6. A compound as defined in claim 1 which is 5-phenyl-2-(2-quinoxalinyl)-3-(p-tolylsulfonyl)oxazolidine.

7. A compound as defined in claim 1 which is 4-methyl-5-phenyl-2-(2-quinoxalinyl) - 3 - (p-tolylsulfonyl)oxazolidine.

8. A compound as defined in claim 1 which is 2-(6-nitro-2-quinoxalinyl)-3-(p-tolylsulfonyl)oxazolidine.

9. A compound as defined in claim 1 which is 3-(2,5-dichlorophenylsulfonyl)-2-(2-quinoxalinyl)oxazolidine.

10. A compound as defined in claim 1 which is 3-(p-chlorophenylsulfonyl)-tetrahydro - 2 - (quinoxalinyl)-2H-1,3 oxazine.

11. A compound as defined in claim 1 which is 3-(p-fluorophenylsulfonyl) - tetrahydro - 2 - (2 - quinoxalinyl)-2H-1,3 oxazine.

References Cited

Chem. Abstracts, vol. 64: 14314e, Bayer, May 1966.

HENRY R. JILES, Primary Examiner

S. D. WINTERS, Assistant Examiner

U.S. Cl. X.R.

260—250 R; 424—248, 250